Sept. 6, 1949.            D. L. MILLER            2,481,324
ENGINE STARTER DRIVE
Filed June 23, 1947
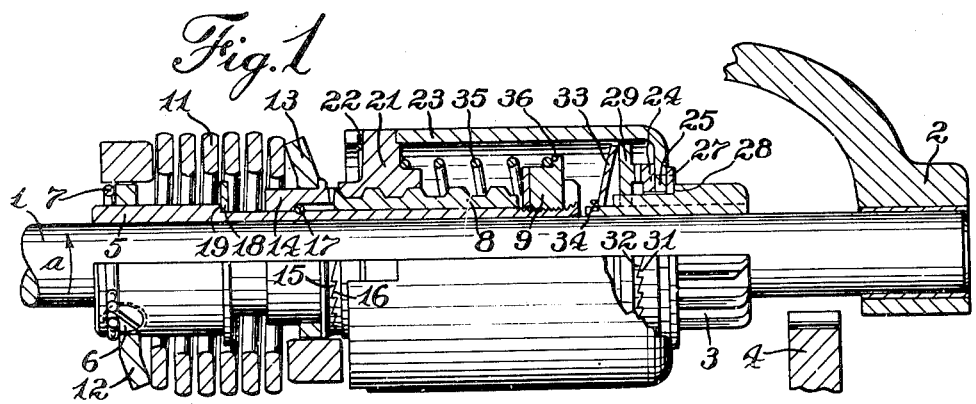
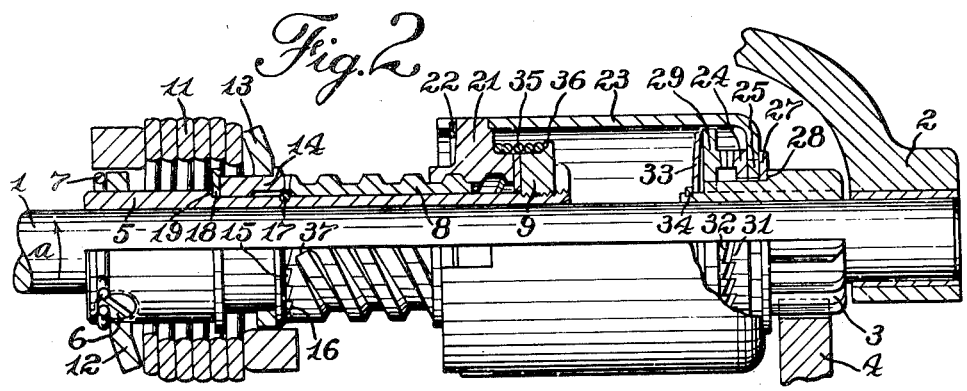
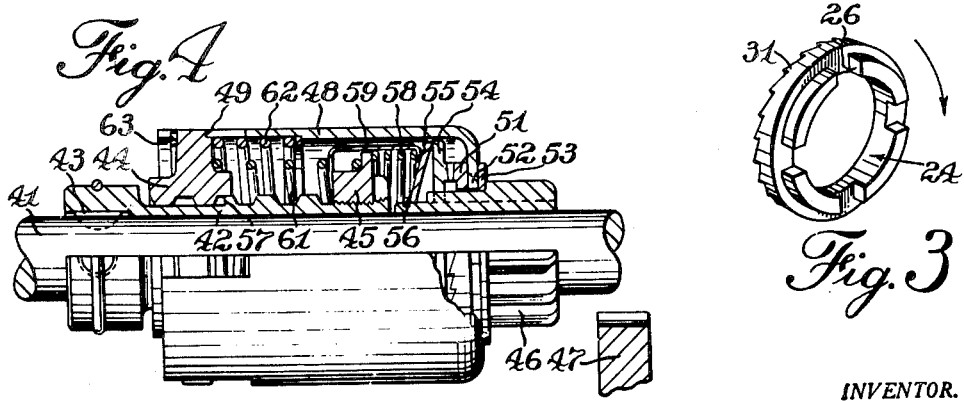
WITNESS:
Esther M. Stockton.
INVENTOR.
Donald L. Miller
BY
Clinton S. Janes.
ATTORNEY Patented Sept. 6, 1949

2,481,324

UNITED STATES PATENT OFFICE 2,481,324

ENGINE STARTER DRIVE

Donald L. Miller, Pine City, N. Y., assignor to Bendix Aviation Corporation, Elmira Heights, N. Y., a corporation of Delaware Application June 23, 1947, Serial No. 756,464

5 Claims. (Cl. 74—7)

The present invention relates to engine starter drives and more particularly to a starter drive having built-in protection against overloads.

In engine starter drives of the automatically engaging type which incorporate a yielding driving connection such as a spring to cushion the shock of engagement, there are several factors which enter into the design of the spring which make it difficult to provide satisfactory performance of all of its functions within the space and cost limitations imposed by the manufacturers of the power plant to be started.

Thus, the function of insuring proper meshing engagement of the driving pinion with the engine ring gear, and of preventing the pinion from pumping out of mesh as the engine goes over the compression points, can best be accomplished with a comparatively light and limber spring. But the function of storing and utilizing the deceleration torque developed by the establishment of the connection between the rapidly rotating parts of the drive and the stationary engine gear requires a spring of at least double the torque capacity of that required to transmit the normal cranking load. If the spring is made of heavier wire, however, to increase its torque capacity, it becomes stiffer, thus causing the deceleration to take place more rapidly and correspondingly increasing the deceleration torque. This effect can be reduced by adding more convolutions to the spring, but this entails a major increase in the size and cost of the spring which is already the most expensive single element in the drive. Moreover, when it is attempted to design a drive spring which will protect the drive from the results of inadvertent engagement of the drive with the engine gear when it is rotating backward, the size and cost become entirely prohibitive.

Attempts have been made to solve this problem by the use of various types of friction clutches which are intended to slip and dissipate excessive torque loads; but it has been found very difficult to produce a clutch of this type in which the torque required to slip the clutch can be controlled and maintained satisfactorily. Moreover, the inertia of the clutch parts and the elements connecting them to the pinion is so great that destructive forces may be produced by the engagement of the drive when the engine is rotating backward rapidly, irrespective of the static torque required to slip the clutch.

It is an object of the present invention to provide a novel engine starter drive incorporating means for accurately limiting the torque transmitted thereby to a predetermined value.

It is another object to provide such a device including a slip clutch, the driven element of which is mounted directly on the pinion, and the inertia of which is small compared to that of the pinion.

It is another object to provide such a device in which the pinion is not required to move longitudinally or to shuttle back and forth during the slipping of the clutch.

It is another object to provide such a device which is durable in construction, small in size and economical to produce.

Further objects and advantages will be apparent from the following description taken in connection with the accompanying drawing, in which:

Fig. 1 is an elevation, partly broken away and in section, of a preferred embodiment of the invention showing the parts in normal or idle position;

Fig. 2 is a similar view showing the parts in the positions assumed when the drive is inadvertently engaged with a backwardly rotating engine gear;

Fig. 3 is a detail in perspective of the driving member of the overload releasing clutch; and Fig. 4 is a view similar to Fig. 1 of an embodiment of the invention in which the clutch constitutes the sole yielding driving connection to the pinion from the starting motor.

In Fig. 1 of the drawing, there is illustrated a power shaft 1 which may be the extended armature shaft of a starting motor not illustrated, the outer end of the shaft being supported in an outboard bearing 2 which is preferably mounted on the frame of the starting motor. A pinion 3 is slidably journalled on the power shaft 1 for movement into and out of mesh with a gear 4 of an engine to be started. A hollow sleeve 5 is fixed on the power shaft in any suitable manner as by means of a pin 6 retained by a lock ring 7, and a screw shaft 8 is slidably journalled on the sleeve 5, confined thereon by a stop nut 9 fixed on said sleeve.

Means for yieldably connecting the screw shaft 8 to rotate with the sleeve 5 and for urging the screw shaft toward its normal position as shown in Fig. 1 is provided comprising a drive spring 11 anchored at one end on the sleeve by means of an anchor plate 12 fixed thereon, and connected by an anchor plate 13 to an overrunning clutch member 14 mounted on the sleeve and having teeth 15 adapted to mesh with corresponding teeth 16 on the end of the screw shaft. The clutch member 14 is located on the sleeve by means of a lock ring 17 so positioned as to maintain the drive spring 11 under slight initial compression, and a thrust washer 18 seated against a shoulder 19 on the sleeve 5 limits the longitudinal movement of the clutch member 14 in the direction to compress said spring. The teeth 15 and 16 of the clutch member 14 and screw shaft 8 are arranged to engage and drive positively in the forward direction of rotation of the drive as indicated by the arrow "a" in Fig. 1, and to permit the screw shaft to overrun said clutch member when the screw shaft is accelerated by the pinion when the engine starts.

Means for actuating the pinion 3 from the screw shaft is provided comprising a control nut 21 threaded on the screw shaft and rigidly connected as indicated at 22 to a barrel member 23. A driving clutch member 24, best shown in Fig. 3, is mounted in the forward end of the barrel 23, and non-rotatably connected therewith as by means of tongues or lugs 25 extending into slots 26 formed in said clutch member. The driving clutch member and barrel have a thrust connection with the pinion through a thrust washer 27 seated against a shoulder 28 formed by turning down the teeth of the pinion. A driven clutch member 29 is splined on the portion of the pinion of reduced diameter, and the driving and driven clutch members 24, 29 are provided with teeth 31, 32 respectively having inclined torque transmitting surfaces whereby the transmission of torque therebetween tends to wedge the clutch members apart to cause disengagement thereof. Means for yieldingly pressing the clutch members into engagement is provided in the form of a concave annular spring member 33 bearing at its outer edge on the driven clutch member 29, and confined on the hub of the pinion 3 by a lock ring 34.

Means for normally maintaining the parts in idle position as shown in Fig. 1, with the teeth 15, 16 of the overrunning clutch member 14 and screw shaft 8 in engagement, is provided in the form of an anti-drift spring 35 located between the control nut 21 and a shoulder 36 on the stop nut 9.

In the operation of this embodiment of the invention, rotation of the power shaft 1 by the starting motor is transmitted through the sleeve 5, spring 11, and overrunning clutch member 14 to the screw shaft 8 whereby the control nut 21, barrel 23 and pinion 3 are traversed longitudinally until the pinion is meshed with the engine gear 4 whereupon the longitudinal movement of the control nut 21 is arrested by the stop nut 9. Thereafter, the screw shaft 8 is traversed to the left, compressing the drive spring 11 until its longitudinal movement is arrested by the thrust washer 18, whereupon the screw shaft, control nut, barrel and pinion are yieldably rotated from the power shaft 1 through the drive spring 11.

The transmission of cranking torque through the overload slip clutch formed by the clutch members 24, 29 tends to wedge these members apart against the force of the spring 33, and the stiffness and the degree of compression of said spring are so coordinated with the angle of inclination of the driving surfaces of clutch teeth 31, 32 that excessive torque loads will cause the clutch members 24, 29 to wedge apart and permit the teeth to slip over each other. Thus, if the starter drive should be actuated inadvertently at a time when the engine gear 4 is rotating backward by reason of backfiring of the engine or from any other cause, the overload clutch 24, 29 will immediately slip as illustrated in Fig. 2 and thereby protect the drive from destructive loads. It will be noted that during the slippage of the clutch, the driven clutch member 29 is free to vibrate longitudinally on the pinion 3, but the pinion is not required to move longitudinally or to shuttle back and forth. Since the inertia of the driven clutch member 29 is comparatively small, it will be appreciated that the resistance to the sudden application of shock loads is correspondingly small, and the imposition of destructive loads on the pinion is avoided by the substantially instantaneous slippage of the clutch.

When the engine starts, the acceleration of the drive pinion by the engine gear 4 causes the parts to be returned to their idle positions, the control nut 21 resting against the heel 37 of the thread on the screw shaft (Fig. 2) which serves as the stop for the control nut thereon. Rebounding of the parts toward the engine gear is prevented by the overrunning connection 15, 16 between the screw shaft 8 and clutch member 14 which permits the screw shaft to ratchet over the clutch member 14 until its rotary movement is dissipated.

In Fig. 4 of the drawing, there is illustrated an embodiment of the invention in which the drive spring 11 is omitted, and the slip clutch connection forms the sole yielding driving connection to the pinion. As there shown, a power shaft 41 has fixed thereon a screw shaft 42 as by means of a key 43, and a control nut 44 is threaded on the screw shaft and confined thereon by a stop nut 45. A pinion 46 is slidably journalled on the power shaft 41 for movement into and out of mesh with an engine gear 47, and means for actuating the pinion from the control nut 44 is provided comprising a barrel 48 having a splined connection 49 with the control nut, and having a driving clutch member 51, similar to the clutch member 24 above described, non-rotatably mounted therein as indicated at 52. The barrel 48 and driving clutch member 51 have a thrust connection with the pinion through a thrust washer 53, and a driven clutch member 54 is pressed into engagement with the driving clutch member 51 by a dished spring member 55 located on the hub of the pinion 46 by a lock ring 56.

The threads of the screw shaft 42 terminate adjacent the idle position of control nut 44 thereon as indicated at 57 whereby the control nut may run off the ends of the threads when the barrel and pinion are thrown back to idle position by the starting of the engine. In order to insure initial reengagement of the control nut with the threads of the screw shaft, a reentry spring 58 is located between the stop nut 45 and the clutch spring 55, a thimble 59 surrounding the reentry spring and stop nut being preferably provided to limit the expansion of the reentry spring and thereby define the idle position of the control nut on the screw shaft. The parts are normally maintained in idle position by an anti-drift spring 61 located between the control nut 44 and stop nut 45.

In order to provide yielding means to facilitate the initial entry of the teeth of pinion 46 into the teeth of engine gear 47, a mesh-enforcing spring 62 is provided for yieldingly pressing the control nut against a retaining ring 63 in the barrel. If a tooth of the pinion should abut against a tooth of the engine gear 47 during the meshing operation, the control nut 44 moves longitudinally in its splined connection with the barrel 48, compressing the mesh enforcing spring 62 until sufficient torque is built up to index the pinion into proper registry with the engine gear teeth. The mesh enforcing spring then expands and snaps the pinion into initial mesh whereupon meshing proceeds as usual.

In this embodiment of the invention, the operation of the drive including the slippage of the clutch members 51, 54 is the same as in the first embodiment of the invention except that the setting of the clutch 51, 54 by means of the clutch spring 55 is such that the clutch is arranged to slip in response to the torque loads produced during normal engagement of the drive, while being arranged to transmit the cranking load without slipping. In this manner, the clutch obviates the necessity for any other yielding driving connection, thereby simplifying and reducing the size of the drive.

Although certain structure has been shown and described in detail, it will be understood that other embodiments of the invention are possible and changes may be made in the design and arrangement of the parts without departing from the scope of the invention.

I claim:

1. An engine starter drive including a screw shaft, a nut threaded thereon, a pinion, means for actuating the pinion from said nut including a driving clutch member rotatably mounted on the pinion having teeth with inclined torque-transmitting surfaces, means including a thrust shoulder on the pinion forming an abutment for the clutch member thereon, a driven clutch member splined on the pinion having teeth with inclined torque transmitting surfaces adapted to cooperate with those of the driving clutch member, and yielding means on the pinion pressing the driven clutch member against the driving clutch member, and the latter against the abutment means.

2. An engine starter drive as set forth in claim 1 including further, a stop for limiting longitudinal movement of the nut, means for rotating the screw shaft, and means limiting longitudinal movement of the screw shaft away from said stop.

3. In an engine starter drive, a power shaft, a pinion slidably journalled thereon, a screw shaft slidably mounted on the power shaft, means connecting the screw shaft to rotate with the power shaft, a nut threaded on the screw shaft, a stop fixed to the power shaft for limiting longitudinal movement of the nut, a barrel fixed to the nut and having a thrust connection wtih the pinion for movement into mesh with a member of an engine to be started, a clutch member non-rotatably mounted in the barrel having inclined torque transmitting surfaces, a corresponding clutch member splined to the pinion and yielding means pressing the clutch members into engagement.

4. In an engine starter drive, a power shaft, a pinion slidably journalled thereon for movement into and out of mesh with a gear of an engine to be started, a screw shaft fixed to the power shaft, a nut threaded on the screw shaft, a barrel splined to the nut at one end and having a swivel connection with the pinion at the other end, a driving clutch member keyed to the barrel, journalled on the pinion and having teeth with inclined torque-transmitting surfaces, a driven clutch member splined to the pinion having inclined torque transmitting surfaces cooperating with those of the driving clutch member, and yielding means pressing the clutch members together.

5. An engine starter drive as set forth in claim 4, in which the screw shaft has a smooth portion permitting the nut to run off the ends of the screw threads when in idle position and including further, a stop on the screw shaft defining the operative position of the nut thereon, a reentry spring between said stop and the driven clutch member urging the barrel and pinion assembly toward meshed position, and means loosely mounted on said stop for limiting the expansion of the reentry spring.

DONALD L. MILLER.

REFERENCES CITED

The following references are of record in the file of this patent:

UNITED STATES PATENTS

| Number | Name | Date |
|---|---|---|
| 2,423,068 | Hood et al. | June 24, 1947 |